(12) United States Patent
Gover

(10) Patent No.: US 12,480,446 B2
(45) Date of Patent: Nov. 25, 2025

(54) THERMAL COMPRESSION REHEATING CYCLE

(71) Applicant: Pratt & Whitney Canada Corp., Longueuil (CA)

(72) Inventor: Christopher John Gover, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/097,315

(22) Filed: Jan. 16, 2023

(65) Prior Publication Data

US 2024/0240590 A1 Jul. 18, 2024

(51) Int. Cl.
| | |
|---|---|
| F02C 7/224 | (2006.01) |
| F02C 7/141 | (2006.01) |
| F02C 7/16 | (2006.01) |
| F23R 3/34 | (2006.01) |

(52) U.S. Cl.
CPC ............. *F02C 7/224* (2013.01); *F02C 7/141* (2013.01); *F02C 7/16* (2013.01); *F23R 3/346* (2013.01); *F05D 2240/35* (2013.01); *F05D 2260/232* (2013.01)

(58) Field of Classification Search
CPC .......... F02C 7/224; F02C 7/141; F02C 7/143; F02C 7/16; F02C 3/34; F02C 6/00; F02C 6/04; F23R 3/346
See application file for complete search history.

(56) References Cited

U.S. PATENT DOCUMENTS

| | | | | |
|---|---|---|---|---|
| 4,271,665 | A * | 6/1981 | Mandrin | F02C 6/18 |
| | | | | 60/39.5 |
| 5,025,635 | A * | 6/1991 | Rockenfeller | F25B 17/083 |
| | | | | 62/480 |
| 5,802,840 | A * | 9/1998 | Wolf | F02C 3/20 |
| | | | | 60/39.52 |
| 6,079,197 | A * | 6/2000 | Attia | F02C 6/02 |
| | | | | 60/39.15 |
| 10,273,882 | B2 | 4/2019 | Kim | |
| 2005/0126171 | A1* | 6/2005 | Lasker | F03G 6/068 |
| | | | | 60/645 |
| 2008/0196410 | A1* | 8/2008 | Primlani | H02S 10/12 |
| | | | | 290/55 |
| 2009/0077944 | A1* | 3/2009 | Wojak | C01B 17/74 |
| | | | | 60/39.461 |

(Continued)

FOREIGN PATENT DOCUMENTS

| | | |
|---|---|---|
| GB | 691049 A | 5/1953 |
| GB | 2346177 A | 8/2000 |

OTHER PUBLICATIONS

Extended European Search Report for European Application No. 24152255.6 mailed Jun. 5, 2024.

*Primary Examiner* — Devon C Kramer
(74) *Attorney, Agent, or Firm* — Carlson, Gaskey & Olds, P.C.

(57) ABSTRACT

A disclosed turbine engine assembly includes a core engine assembly generating an exhaust gas flow and a thermal compressor where the exhaust gas flow from the core engine is received and compressed. The thermal compressor includes a converging duct that recompresses the exhaust gas flow that is mixed with fuel in a secondary combustor and ignited to generate a reheated gas flow.

7 Claims, 5 Drawing Sheets

(56) References Cited

U.S. PATENT DOCUMENTS

| | | | |
|---|---|---|---|
| 2009/0301054 A1* | 12/2009 | Simpson | F02C 1/06 |
| | | | 60/39.15 |
| 2009/0317242 A1* | 12/2009 | Down | F02C 7/18 |
| | | | 415/176 |
| 2011/0162375 A1* | 7/2011 | Berry | F02C 7/222 |
| | | | 60/734 |
| 2014/0083109 A1* | 3/2014 | Oelfke | F02C 1/005 |
| | | | 60/39.5 |

* cited by examiner

THERMAL COMPRESSION REHEATING CYCLE

BACKGROUND

Turbine engines ignite a mixture of compressed air and fuel in a combustor to generate a high temperature and energy exhaust gas flow. The exhaust gas flow expands through a turbine to generate shaft power that is utilized to drive a propulsor and engine accessory components. Upon expansion through the turbine section, the exhaust gas flow is typically exhausted to the ambient environment. Any remaining thermal energy in the exhaust gas flow is also simply exhausted to the ambient environment and wasted. Engine efficiency may be improved by using the waste heat to generate additional power.

Aircraft engine manufacturers continue to seek further improvements to engine performance including improvements to thermal, transfer and propulsive efficiencies.

SUMMARY

A turbine engine assembly according to one example disclosed embodiment includes, among other possible things, a core engine assembly generating an exhaust gas flow and a thermal compressor where the exhaust gas flow from the core engine is received and compressed. The thermal compressor comprising a converging duct that recompresses the exhaust gas flow. The turbine engine assembly further includes a secondary combustor where fuel is mixed with the recompressed exhaust gas flow from the thermal compressor and ignited to generate a reheated gas flow.

A thermal energy recuperation assembly according to another disclosed example embodiment includes, among other possible things, a thermal compressor including a fixed converging duct where a gas flow is compressed free from rotating components. The converging duct is in thermal communication with a cooling medium. A secondary combustor is provided where a recompressed gas flow from the thermal compressor is mixed with fuel and ignited to generate a reheated gas flow that is communicated to secondary turbine where the reheated gas flow is expanded to generate shaft power.

A method of recuperating thermal energy from an aircraft engine assembly according to another disclosed example embodiment includes, among other possible things, recompressing an exhaust gas flow generated by a core engine assembly by compression through a static converging duct, mixing the recompressed exhaust gas flow from the thermal compressor with fuel in an auxiliary combustor and igniting the mixture to generate a reheated exhaust gas flow, and expanding the reheated exhaust gas flow through an auxiliary turbine to generate shaft power.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
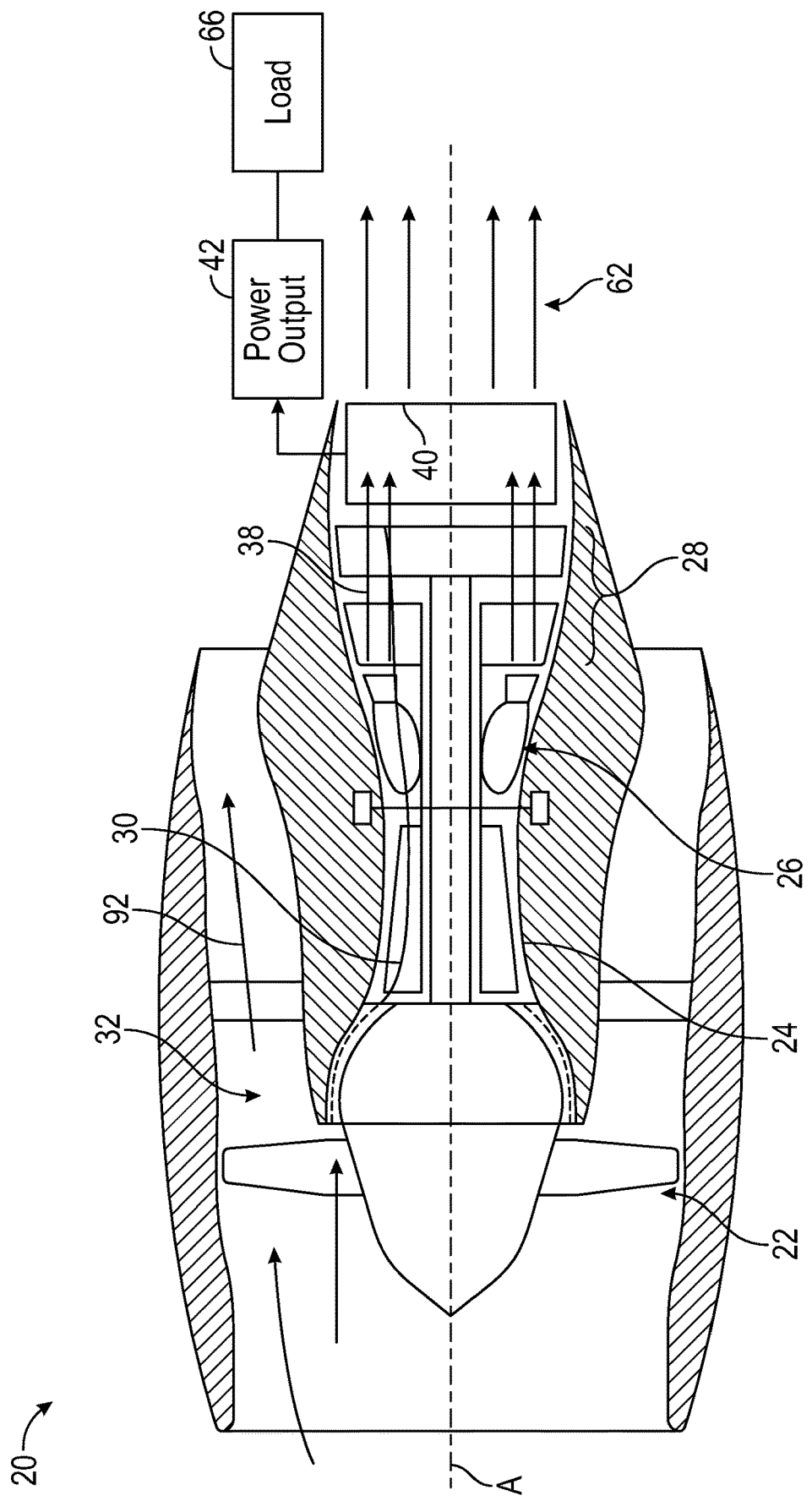
FIG. 1 is a schematic view of an example turbine engine including a thermal energy recuperation system.

FIG. 1 schematically illustrates a turbine engine assembly 20. The turbine engine 20 generally incorporates a fan section 22, a compressor section 24, a combustor section 26 and a turbine section 28 as a core engine disposed along a common longitudinal axis A. The fan section 22 drives air along a bypass flow path 32, while the compressor section 24 drives air along a core flow path 30 for compression and communication into the combustor section 26. Compressed air flow communicated to the combustor 26 is mixed with fuel and ignited to generate a high energy exhaust gas flow 38 that drives rotation as it expands through the turbine section 28. The turbine section 28 is coupled to drive the compressor section 24 and the fan section 22. In this disclose example, a bypass flow path 32 is defined around the core engine for a bypass flow 92.

Although depicted as a turbofan turbine engine in the disclosed non-limiting embodiment, it should be understood that the concepts described herein are not limited to use with turbofans as the teachings may be applied to other types of turbine engines. Moreover, although turbine engines are described by way of example, other engine configurations such as internal combustion engines could be utilized and are within the contemplation of this disclosure.

The exhaust gas flow 38 that expands through the turbine section 28 includes a significant amount of thermal energy that conventionally is simply exhausted to the ambient environment. The disclosed engine assembly 20 includes a thermal energy recuperation system 40 that produces a power output 42 to drive a load 66. The load 66 may be any component associated with operation of the engine assembly 20 and/or an aircraft if the efficiency improvement technology described herein is applied in the aerospace field, which does not have to be the case. Such loads 66 may include electric generators, hydraulic pumps, fuel pumps, accessory gear boxes and any other accessory component that may use generated shaft power.

Figure 2:
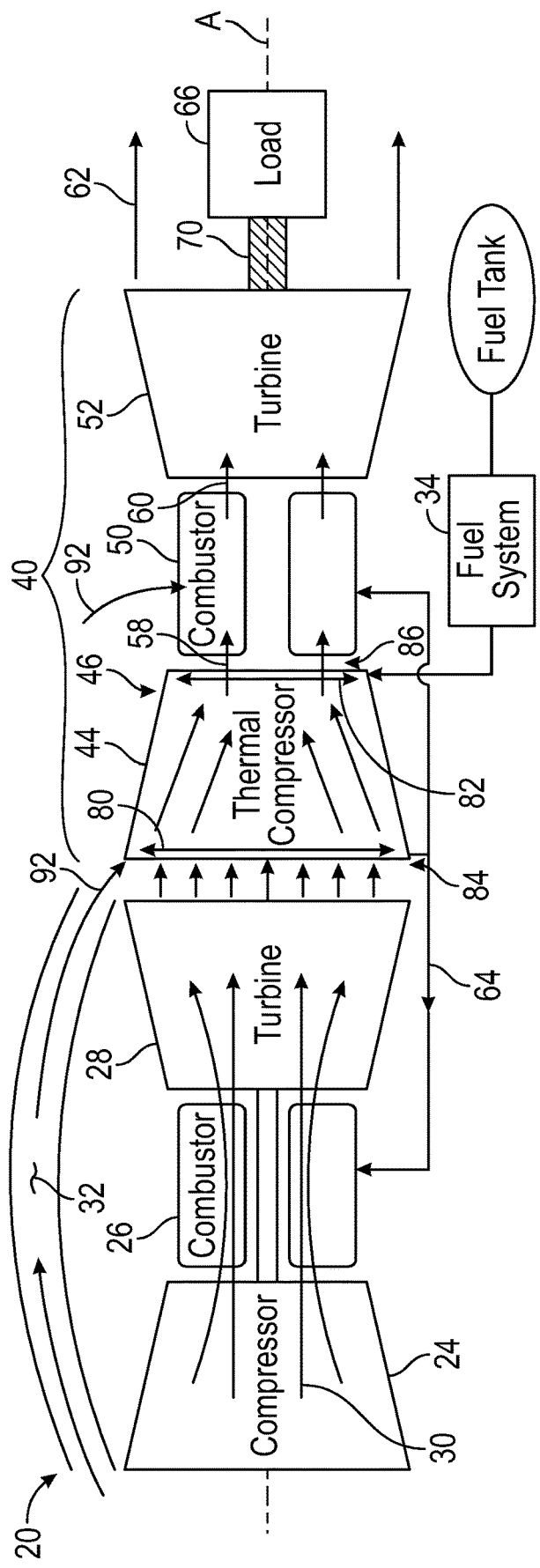
FIG. 2 is a simplified schematic view of the example turbine engine and thermal energy compression system.

Referring to FIG. 2 with continued reference to FIG. 1, the example engine assembly 20 is shown in a simplified schematic view with the recuperation system 40 disposed aft of the turbine section 28 along the engine longitudinal axis. The recuperation system 40 includes a thermal compressor 44 that receives exhaust gas flow 38 exiting the turbine section 28. The exhaust gas flow 38 is recompressed in the thermal compressor 44 to generate a recompressed gas flow 58 that is communicated to an auxiliary combustor 50. The recompressed gas flow 58 is mixed with fuel in the auxiliary combustor 50 and ignited to generate a reheated exhaust gas flow 60 that is expanded through an auxiliary turbine 52. The amount of energy added in the auxiliary combustor 50 enhances energy recovery by taking advantage of any remaining oxygen present in the exhaust gases that support further combustion. Moreover, a portion of the bypass flow 92 is shown schematically as being communicated into the thermal compressor 44 and/or to the auxiliary combustor 50 to further enhance and facilitate combustion. The auxiliary turbine 52 drives a shaft 70 coupled to a load 66. The load 66 is schematically shown and may be any component or device utilized in operation of the engine and/or aircraft.

The thermal compressor 44 recompresses the exhaust gas flow 38 is a fixed, static duct that compresses the exhaust gas flow free from shaft power input from the auxiliary turbine 52 or the core engine 20. The thermal compressor 44 includes a fixed converging duct 46 with a forward end 84 with a first cross-sectional area 80. An aft end 86 of the converging duct 46 includes a second cross-sectional area 82 that is less than the first cross-sectional area 80. The cross-sectional areas 80 and 82 may be of any shape configured to receive the exhaust gas flow 38 from the turbine section 28. The converging duct 46 is illustrated as converging in height, but may also simultaneously converge in height and width. Moreover, the converging duct may be frusto-conical and the decreasing cross-sectional area is a decreasing radius. Moreover, the example converging duct 46 is illustrated by way of example as symmetric about the longitudinal axis A. However, the duct 46 may be non-symmetric about the axis. Additionally, the angle at which the duct converges from the forward end 84 toward the aft end 86 may vary based on application specific requirements.

Figure 3:
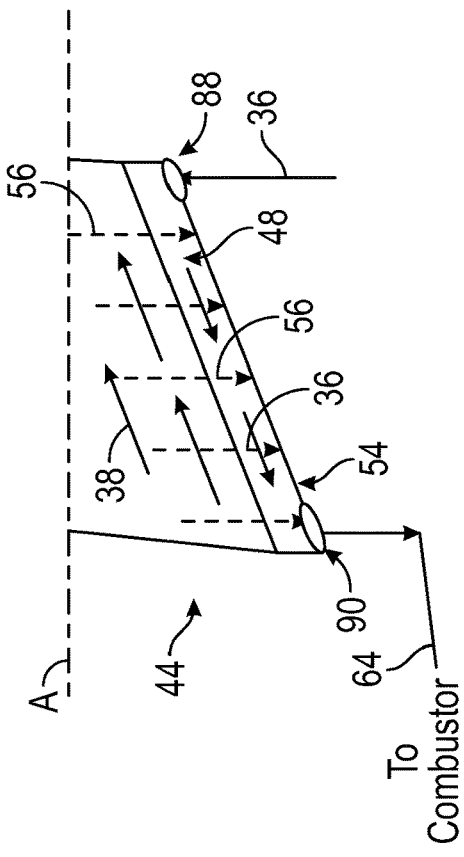
FIG. 3 is an enlarged schematic view of a portion of an example converging duct embodiment.

Referring to FIG. 3 with continued reference to FIG. 2, the converging duct 46 includes walls 54 with passages 48 for a cooling medium flow. In one disclosed example, the cooling medium is a fuel flow 36 that is provided by a fuel system 34. The fuel flow 36 is communicated through an inlet 88 proximate the aft end 86 and flows through the passage 48 to an outlet 90. The fuel flow 36 accepts heat schematically indicated by arrows 56 from the exhaust gas flow 38 within the converging duct 46. The accepted heat cools the exhaust gas flow 38 to aid in recompression as the flow is compressed through the thermal compressor 44.

The fuel flow 36 is heated and exhausted as a heated fuel flow 64. The heated fuel flow 64 is communicated to the combustor 26 and the auxiliary combustor 50. It should be appreciated that although fuel is disclosed by way of example as the cooling medium, other flows could be utilized as the cooling medium and are within the contemplation of this disclosure. For example, bypass flow 92, lubricant and hydraulic fluids could be utilized for cooling. Moreover, a dedicated cooling medium within a closed system could also be utilized and is within the contemplation of this disclosure.

Figure 4:
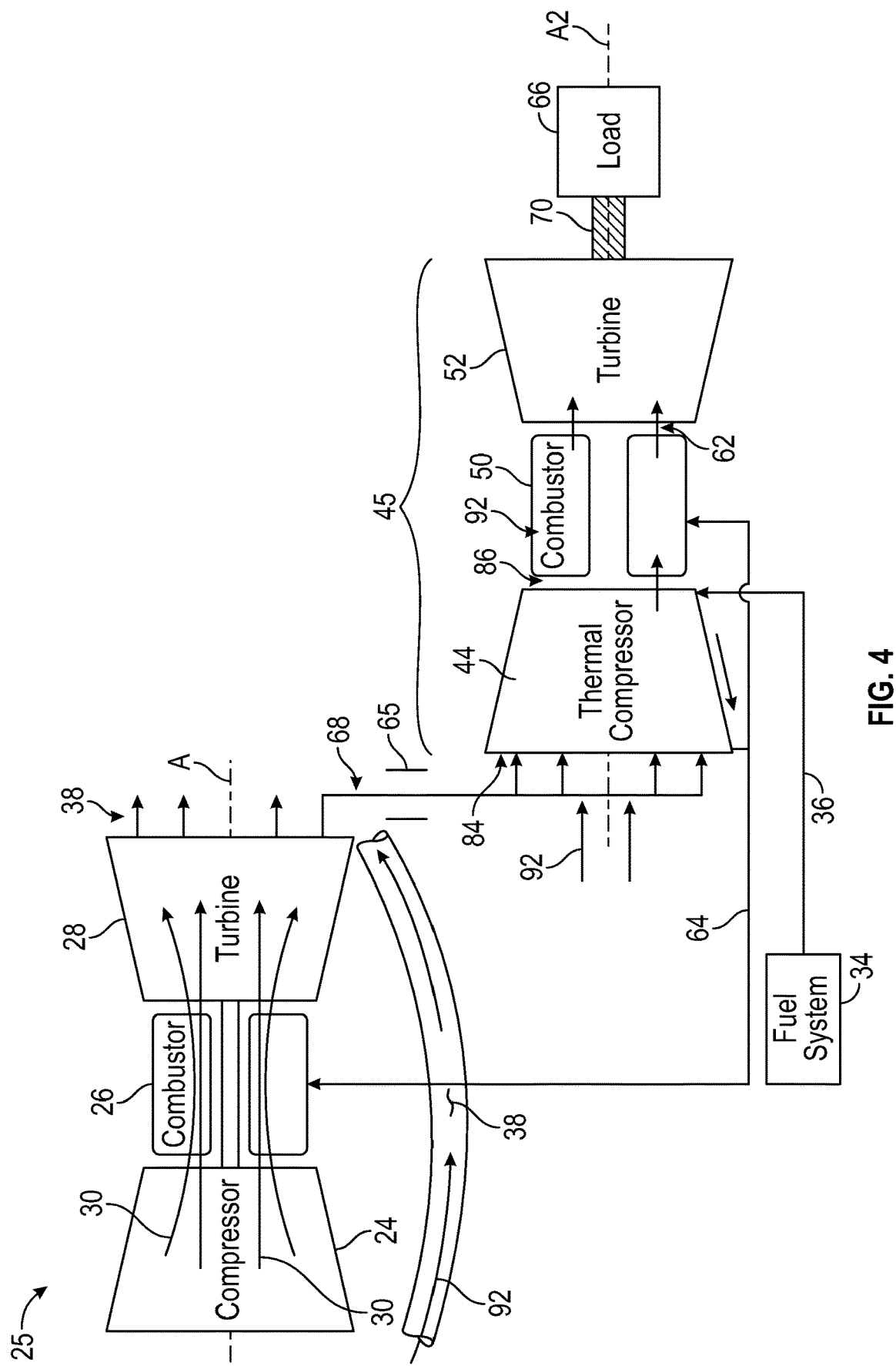
FIG. 4 is a schematic view of another turbine engine and thermal energy compression system embodiment.

Referring to FIG. 4 another example engine assembly 25 is shown that includes the recuperation system 45 set apart from the engine longitudinal axis A. In this disclosed example, the recuperation system 45 is disposed along a separate axis A2 and only a portion 68 of the exhaust gas flow 68 is routed to the thermal compressor 44 through a duct 65. The recuperation system 45 may be sized to meet additional power requirements to drive a corresponding load 66. In this disclosed example, the portion of exhaust gas flow 68 is communicated along with a portion of bypass airflow 92 to the thermal compressor 44, recompressed, mixed with fuel and ignited to generate a reheated exhaust gas flow 62. Bypass airflow 92 may also be communicated directly to the auxiliary combustor 50 to facilitate combustion. The reheated gas flow 62 from the auxiliary combustor 50 is expanded through the auxiliary turbine 52 to create additional shaft power. The additional shaft power is provided by thermal energy that would otherwise simply be exhausted to the ambient environment and therefore provides increased engine efficiency.

Figure 5:
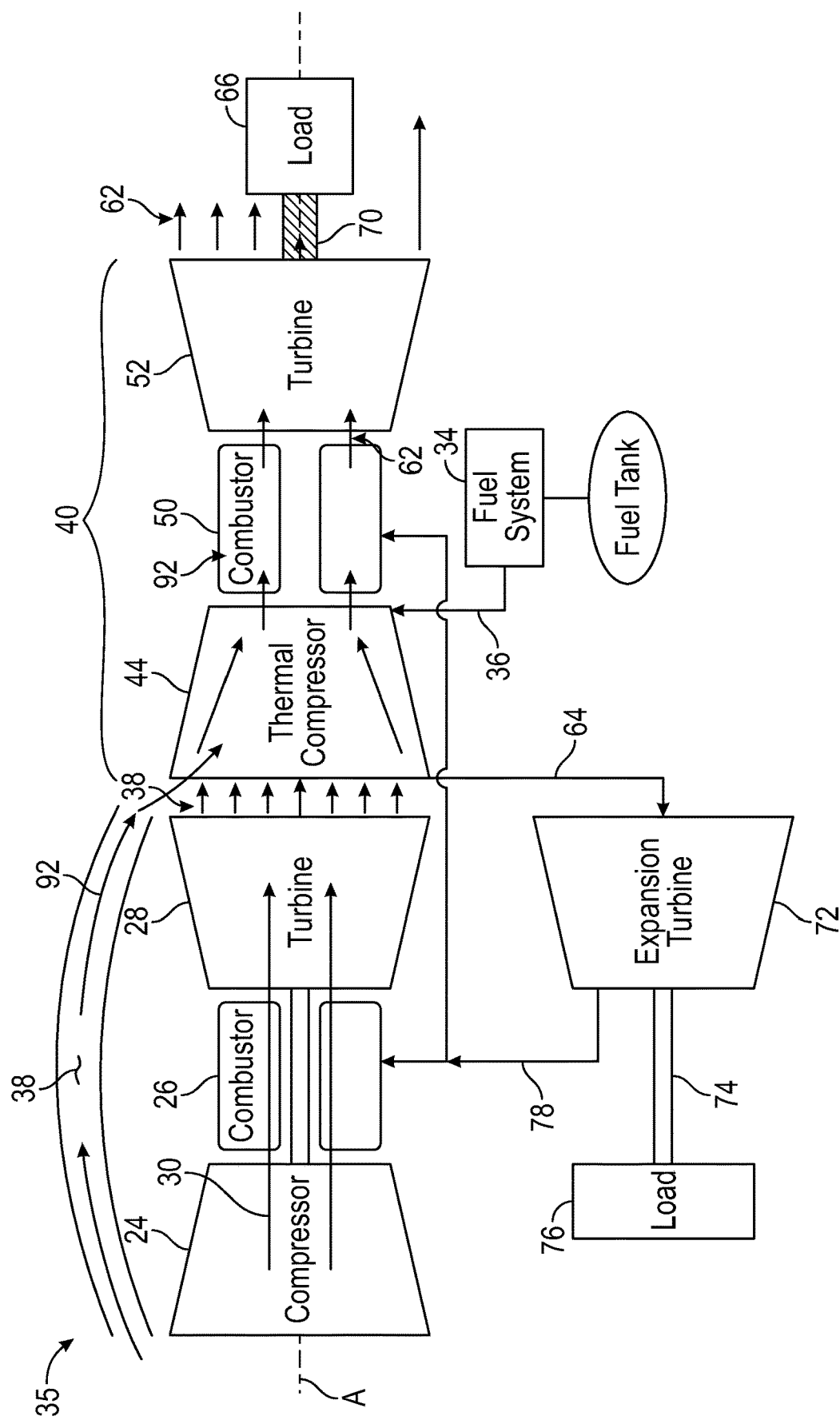
FIG. 5 is a schematic view of another turbine engine and thermal energy compression system embodiment.

Referring to FIG. 5, another example engine assembly 35 includes an expansion turbine 72 that reclaims a portion of the thermal energy transferred to the cooling medium flow in the thermal compressor 44. In this disclosed example, the cooling medium is the fuel flow 36 provided by the fuel system 34. A relatively cool fuel flow 36 is passed through the walls of the thermal compressor 44 to cool and aid in recompressing the exhaust gas flow.

The heated fuel flow 64 is communicated to an expansion turbine 72. Expansion of the heated fuel flow 64 drives the expansion turbine 72 to generate shaft work by driving an auxiliary shaft 74. The auxiliary shaft 74 is coupled to drive a load 76. The load 76 can be any component of the engine and/or aircraft. The additional shaft power provided by reclaiming heat from the fuel flow provides for further increases in overall operating efficiencies. The expansion turbine 72 may be disposed in any location proximate the engine that corresponds with the load. A cooled fuel flow 78 from the expansion turbine 72 may than be communicated to the combustors 26, 50 and/or to other components that use the fuel as a heat sink.

Figure 6:
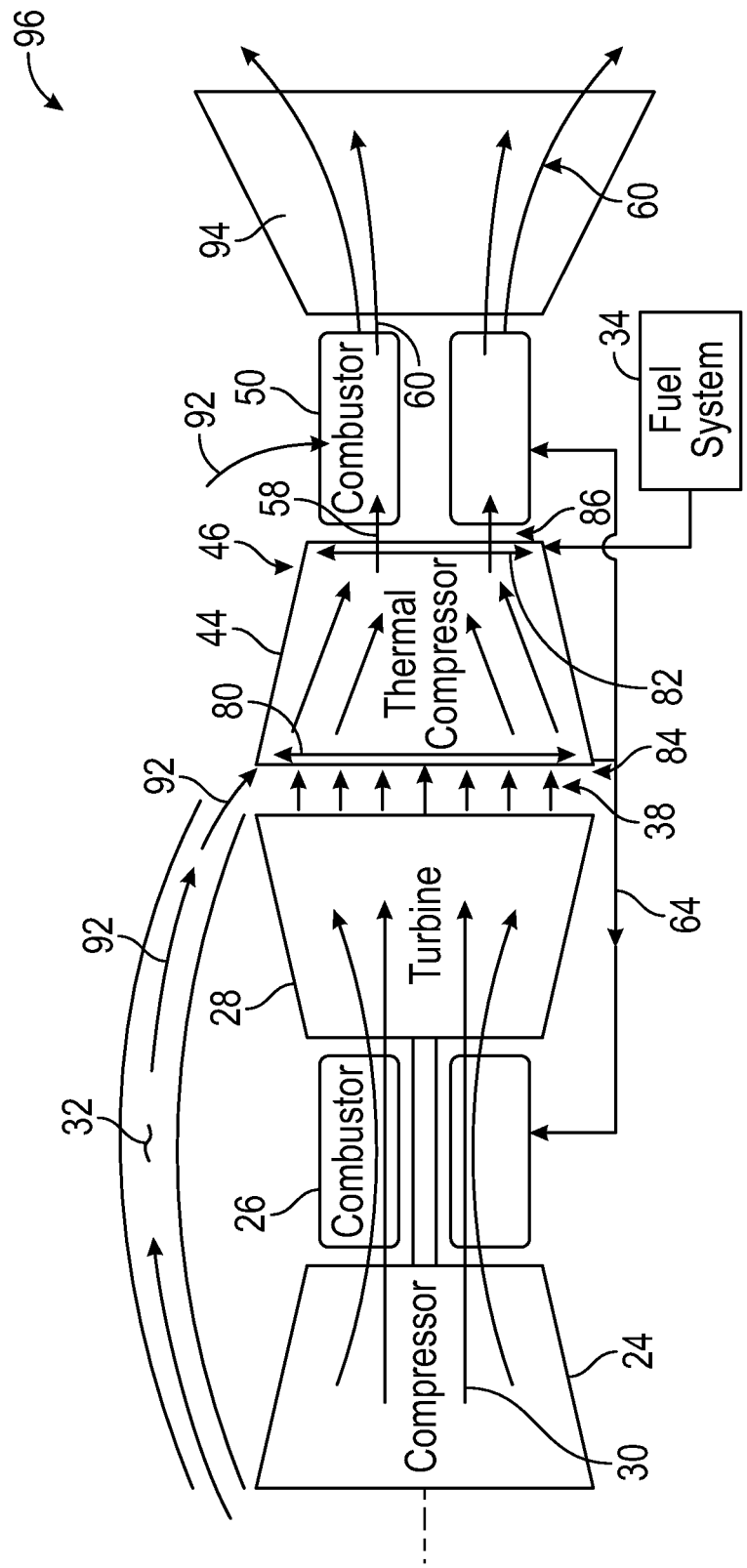
FIG. 6 is a schematic view of another turbine engine and thermal energy compression system embodiment.

Referring to FIG. 6, another example engine assembly 96 is schematically shown and includes an exhaust nozzle 94 for the reheated exhaust gas flow 60. The reheated exhaust gas flow 60 is generated from a compressed exhaust gas flow 38 from the thermal compressor 44 that is mixed with fuel a heated fuel flow 64 and ignited. A portion of the bypass airflow 92 may be introduced with the exhaust gas flow 38 through the thermal compressor 44 to provide additional oxygen for combustion. Additionally, bypass airflow 92 may also be introduced directly into the auxiliary combustor 50.

The reheated exhaust flow 60 is directed through the exhaust nozzle 94 to generate an increased propulsive thrust. In this example, the reheated exhaust gas flow 60 is reenergized and provides an increased propulsive thrust as compared to simply exhausting the gas flow 38 from the turbine section 28. Moreover, compression of the exhaust gas flow 38 in the thermal compressor 44 further increases propulsive output from the auxiliary combustor 50 as compared to simply adding additional fuel to a non-compressed flow of exhaust gases. The increased propulsive thrust generated by the auxiliary combustor 50 could be selectively provided by controlling fuel flow. Accordingly, the example engine assembly 96 may provide a supplemental propulsive thrust to augment aircraft performance for selected intervals. Alternatively, the auxiliary combustor 50 could be operated at different power settings to tailor operation to aircraft operating conditions.

The disclosed recuperation system example embodiments provide recuperation of thermal energy that would otherwise be lost to the ambient environment without requiring additional power from the core engine. Moreover, additional combustion of the recompressed exhaust gases provides for use of any additional oxygen to further increase available reclaimed energy.

A turbine engine assembly according to an exemplary embodiment of this disclosure, among other possible things includes a core engine assembly 20, 25, 35 that generates an exhaust gas flow 38, a thermal compressor 44 where the exhaust gas flow 38 from the core engine 20, 25, 35 is received and compressed, the thermal compressor 44 includes a converging duct 46 that recompresses the exhaust gas flow 38, and a secondary combustor where fuel is mixed with the recompressed exhaust gas flow 58 from the thermal compressor 44 and ignited to generate a reheated gas flow 60.

In a further embodiment of the foregoing, the turbine engine assembly 20, 25, 35, 96 includes a secondary turbine section 52 where the reheated gas flow 60 is expanded to generate shaft power.

In a further embodiment of any of the foregoing, the converging duct 46 includes a forward end 84 with a cross-sectional flow area that is larger than a cross-sectional flow area of an aft end 86. The recompressed exhaust gas flow 38 is exhausted through the aft end 86 and communicated to the secondary combustor 50.

In a further embodiment of any of the foregoing, the converging duct 46 is in thermal communication with a cooling medium for cooling the exhaust gas flow 38 as it flows through the thermal compressor 44.

In a further embodiment of any of the foregoing, the converging duct 46 includes cooling passages through which the cooling medium flows.

In a further embodiment of any of the foregoing, the cooling passages include an inlet 88 that is disposed proximate the aft end 86 and an outlet 90 that is disposed proximate the forward end 84.

In a further embodiment of any of the foregoing, the turbine engine assembly 20 includes an expansion turbine 72 where heated cooling medium is expanded to drive an auxiliary shaft 74.

In a further embodiment of any of the foregoing, the cooling medium includes a fuel flow 36 from a fuel system 34 and fuel exhausted from the expansion turbine 72 is communicated to at least one of a combustor of the core engine 20 and the secondary combustor 50.

In a further embodiment of any of the foregoing, the thermal compressor 44 is disposed along an engine longitudinal axis that is common with the core engine assembly.

In a further embodiment of any of the foregoing, the thermal compressor 44 is disposed outside of a core flow path 30 of the core engine assembly 20, 25, 35.

In a further embodiment of any of the foregoing, the thermal compressor 44 is disposed outside of a core flow path 30 and an amount of exhaust gas flow 38 that is less than the total exhaust gas flow exhausted from the core engine 20, 25, 35 is communicated through a duct 46 to the thermal compressor 44.

In a further embodiment of any of the foregoing, the thermal compressor 44 includes a static converging duct 46 for compression of the exhaust gas flow 38 through the thermal compressor 44 that is free from input shaft power.

A thermal energy recuperation assembly 40, 45 according to another exemplary embodiment of this disclosure, among other possible things includes a thermal compressor 44 that includes a fixed converging duct 46 where a gas flow 38 is compressed free from rotating components, the converging duct 46 is in thermal communication with a cooling medium. In a secondary combustor 50, the recompressed gas flow 58 from the thermal compressor 44 is mixed with fuel and ignited to generate a reheated gas flow 62, and a secondary turbine 52 where the reheated gas flow 62 is expanded to generate shaft power.

In a further embodiment of the foregoing, the thermal energy recuperation assembly 40, 45 includes a cooling passage that is disposed along the converging duct 46 for a flow of the cooling medium.

In a further embodiment of any of the foregoing, the thermal energy recuperation assembly 40, 45 includes an expansion turbine 72 where the flow of cooling medium exhausted from the thermal compressor 44 is expanded to drive an auxiliary output shaft 70.

In a further embodiment of any of the foregoing, the thermal compressor 44 is disposed along an axis common with a core engine assembly 20, 25, 35.

In a further embodiment of any of the foregoing, the thermal compressor 44 and expansion turbine 72 are disposed outside of a core flow path 30 of the core engine assembly 20, 25, 35.

A method of recuperating thermal energy from an aircraft engine assembly according to another exemplary embodiment of this disclosure, among other possible things includes recompressing an exhaust gas flow 60 that is generated by a core engine assembly by compression through a static converging duct 46, mixing the recompressed exhaust gas flow 60 from the thermal compressor 44 with fuel in an auxiliary combustor 50 and igniting the mixture to generate a reheated exhaust gas flow 60, and expanding the reheated exhaust gas flow 60 through an auxiliary turbine 52 to generate shaft power.

In a further embodiment of the foregoing, the method includes heating a cooling medium that flows through passages in the thermal compressor 44 and expanding the heated cooling medium through an expansion turbine 72 to generate auxiliary shaft power.

In a further embodiment of any of the foregoing, the cooling medium includes a fuel flow 36 and further includes communicating the heated fuel flow 64 to at least one of the auxiliary combustor 50 and a combustor of the core engine assembly 20, 25, 35.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine assembly comprising: a core engine assembly generating an exhaust gas flow; a thermal compressor where the exhaust gas flow from the core engine is received and compressed, the thermal compressor comprising a static converging duct where the exhaust gas flow is recompressed and cooled without input power and moving components, wherein the thermal compressor includes walls with at least one passage for a flow of a cooling medium for cooling the exhaust gas flow, the at least one passage is separate from the static converging duct for the exhaust gas flow; wherein the converging duct includes a forward end with a cross-sectional flow area larger than a cross-sectional flow area of an aft end, wherein the recompressed exhaust gas flow is exhausted through the aft end and communicated to a secondary combustor, wherein the cooling passages include an inlet disposed proximate the aft end and an outlet disposed proximate the forward end; the
 a secondary combustor where fuel is mixed with the recompressed exhaust gas flow from the thermal compressor and ignited to generate a reheated gas flow; and
 a secondary turbine section where the reheated gas flow is expanded to generate shaft power.

2. The turbine engine assembly as recited in claim 1, wherein the converging duct is in thermal communication with the cooling medium for cooling the exhaust gas flow as it flows through the at least one passage for the flow of the cooling medium within the walls of the thermal compressor.

3. The turbine engine assembly as recited in claim 2, including an expansion turbine where heated cooling medium is expanded to drive an auxiliary shaft.

4. The turbine engine assembly as recited in claim 3, wherein the cooling medium comprises a fuel flow from a fuel system and fuel exhausted from the expansion turbine is communicated to at least one of a combustor of the core engine and the secondary combustor.

5. The turbine engine assembly as recited in claim 1, wherein the thermal compressor is disposed along an engine longitudinal axis common with the core engine assembly.

6. The turbine engine assembly as recited in claim 1, wherein the thermal compressor is disposed outside of a core flow path of the core engine assembly.

7. The turbine engine assembly as recited in claim 1, wherein the thermal compressor is disposed outside of a core flow path and an amount of exhaust gas flow that is less than the total exhaust gas flow exhausted from the core engine is communicated through a duct to the thermal compressor.

\* \* \* \* \*